US012662579B2

(12) United States Patent
Epstein et al.

(10) Patent No.: US 12,662,579 B2
(45) Date of Patent: Jun. 23, 2026

(54) DISPOSABLE FILM WRAP SYSTEM FOR USE WITH HANDHELD DEVICES

(71) Applicants: Mary Lawren Epstein, Austin, TX (US); Cary Alan Kipke, Pflugerville, TX (US)

(72) Inventors: Mary Lawren Epstein, Austin, TX (US); Cary Alan Kipke, Pflugerville, TX (US)

( * ) Notice: Subject to any disclaimer, the term of this patent is extended or adjusted under 35 U.S.C. 154(b) by 1075 days.

(21) Appl. No.: 17/655,390

(22) Filed: Mar. 18, 2022

(65) Prior Publication Data

US 2023/0002571 A1     Jan. 5, 2023

Related U.S. Application Data

(60) Provisional application No. 63/138,866, filed on Jan. 19, 2021.

(51) Int. Cl.
C08J 5/18          (2006.01)
C08J 7/04          (2020.01)
(Continued)

(52) U.S. Cl.
CPC ................. C08J 5/18 (2013.01); C08J 7/042 (2013.01); C08J 7/043 (2020.01); C09D 5/20 (2013.01)

(58) Field of Classification Search
CPC .................. H05K 5/03; B32B 2457/20; B32B 2307/412; B32B 2307/748; B32B 3/085; B32B 7/05; B32B 7/12; B32B 2571/00; Y10T 428/28; C08J 5/18; C08J 7/042; C08J 7/043; C08J 2203/318; C08J 2301/12;
(Continued)

(56) References Cited

U.S. PATENT DOCUMENTS 6,388,813 B1 *   5/2002   Wilson .................... B32B 37/12
                                                            359/630
10,165,839 B2 *   1/2019   Richardson ............. H04M 1/18
                (Continued)

FOREIGN PATENT DOCUMENTS

KR       2018-0058955 A  *   6/2018   ............. B65D 85/48
WO     WO-2019135082 A1  *   7/2019   ........... B32B 7/0046

OTHER PUBLICATIONS

Machine translation of description of KR 2018-0058955A (Year: 2025).*

*Primary Examiner* — Scott R. Walshon
(74) *Attorney, Agent, or Firm* — Dunlap Bennett & Ludwig PLLC

(57)          ABSTRACT

A disposable film wrap system for use with handheld devices is provided. The cover film provides a protective barrier against human contact with a device and is intended to prevent the spread of microbial or viral particulates from the device to a device user. The system includes a primary film layer, a secondary film layer and film support layers. The film wrap system is embodied in a barrier applicator assembly that envelopes the device in the primary film layer. The secondary film layer is removably adhered to the primary film layer and disposed of by the end-user to expose the non-contaminated primary film layer. This feature ensures that any transfer of microbes or viruses that may have occurred during the wrapping process, by a person other than the primary user, are no longer present.

20 Claims, 10 Drawing Sheets

(51) Int. Cl.
    *C08J 7/043*       (2020.01)
    *C09D 5/20*       (2006.01)

(58) Field of Classification Search
    CPC .......... C08J 2301/302; C08J 7/29; C08J 7/20;
              C09D 5/20; B29C 63/0004; B29C 63/02;
              B29L 2031/3437; B29L 2031/3475; B29L
                           2571/00; G06F 1/1607
    See application file for complete search history.

(56)                     References Cited

U.S. PATENT DOCUMENTS

| | | | |
|---|---|---|---|
| 2015/0107767 A1* | 4/2015 | Wadsworth | B32B 37/003 |
| | | | 156/324 |
| 2017/0274623 A1* | 9/2017 | Sherman | B32B 27/365 |
| 2020/0117029 A1* | 4/2020 | Sung | B32B 7/02 |
| 2021/0016598 A1* | 1/2021 | Rubin | B32B 7/06 |

* cited by examiner

DISPOSABLE FILM WRAP SYSTEM FOR USE WITH HANDHELD DEVICES

CROSS-REFERENCE TO RELATED APPLICATION

This application claims the benefit of priority of U.S. provisional application No. 63/138,866, U.S. provisional application number filed 19 Jan. 2021, the contents of which are herein incorporated by reference.

BACKGROUND OF THE INVENTION

The present invention relates to disposable film wrap systems for use with handheld devices and, more particularly, a barrier application system for forming a barrier between a handheld device and the human hand, thereby preventing the spread of microbial or viral particulates from the device to the device user. The barrier application system embodies a barrier applicator assembly. The barrier applicator assembly includes a primary film layer, a secondary film layer that is removably adhered to an exterior surface of the primary film and a carrier structure comprising separate support layers that is removably adhered to an exterior surface of one or both primary and/or secondary film layers.

The inventor is confident that, when confronted with a device with an antiviral and/or antimicrobial protective cover, they are not the only one who wonders whether the person who applied the protective cover in the first place did not themselves contaminate the outer surface of the protective cover that the user is now asked to trust as uncontaminated, thereby frustrating the purpose of the protective cover.

Protective cover applicators for handheld or hand-operated devices known in the art are not conformable two-layer systems that provide the end-user with a removable secondary film layer to the microbial-free and virus-free primary film layer. Rather, existing covers for handheld devices are merely film wraps or bags do not ensure that the person that wrapped the handheld device did not indeed contaminate the protective cover prior to handling by the end-user.

As can be seen, there is a need for a disposable film wrap system for use with handheld devices embodying a disposable cover film assembly that forms a barrier between a handheld device and the human hand during the initial wrapping of the device and during subsequent use of the handheld device, thereby affording additional peace of mind to subsequent users.

The disposable cover film assembly includes a thin primary film layer that is geometrically asymmetric, a thin secondary film layer that is removably adhered to the primary film layer, and a carrier structure composed of a plurality of support layers that are removably adhered to the primary layer and, in some cases, the secondary film layer.

The cover film assembly provides a conformable protective barrier for a handheld device, designed to prevent the spread of microbial or viral particulates from the device to its user through a contaminant-free primary film layer. A unique feature of the film wrap system is the presence of the secondary film layer that is applied simultaneously with the primary film layer. The secondary film layer presents itself to the end-user for their removal to expose the contaminant-free primary film layer that was shielded by the secondary film layer during initial application of the film cover system.

In one aspect, the primary film layer has a modified trapezoid shape with two extending flaps to assist in the application of the cover film system to a device. Specific sections of the film wrap system are sequentially folded over the top, bottom, left and right sides of a handheld device and provide a facile methodology to wrap and encase such device.

In another aspect, the support layers are removably adhered to the primary film layer as four discrete support sections. This design allows each discrete support section to be removed sequentially as the cover film system is sequentially folded over a handheld device.

In another aspect, a secondary film layer is offset from the center of the primary film layer so that it entirely covers the encased handheld device. This feature ensures that the primary film layer—that will be exposed by the user upon removing the secondary film layer—is not contaminated from any contact that may have occurred during the wrapping process. The end user can use a variety of methods to remove the secondary film layer to minimize direct skin contact (e.g., sanitizing or wearing gloves). The secondary film layer is preferably a colored or tinted film that is easily differentiated from the transparent primary film layer and is removed by the user to expose a previously untouched primary film layer (i.e., first-time use).

In any of the above embodiments, the film wrap system is constructed using transparent and conformable film components so that the encased handheld device control buttons can be easily visualized and manipulated.

In another aspect, the film wrap system is designed so that the pressure sensitive adhesive can be detached from a handheld device after use and leave no unwanted residue.

In another aspect, the film wrap system can be printed in specific locations with visual or numeric indicators or indicia to guide in the step-by-step application of the film wrap system to a handheld device.

In any of the above embodiments, the film wrap system can be sized to conform to a variety of handheld devices.

SUMMARY OF THE INVENTION

In one aspect of the present invention, a barrier applicator assembly for a handheld device includes the following: a primary film layer having opposing exterior and interior primary surfaces; a primary adhesive along the interior primary surface; a secondary film layer adhered along the exterior primary surface; and a plurality of support layers adhered to portions of the exterior primary surface, wherein the plurality of support layers defines an opening through which the primary and secondary film layers are visible.

In another aspect of the present invention, the barrier applicator assembly further includes wherein the primary film layer comprises longitudinally opposing first and second primary edges, and further comprising a first flap and a second flap extending from the first and second primary edges, respectively, away from the opening, wherein the primary film layer comprises latitudinal opposing distal and proximal primary edges, wherein the distal primary edge provides cut corners, wherein each support layer has a tab that protrudes beyond the first, second, distal, and proximal primary edges, wherein a proximal edge of the secondary film layer aligns with a substantial portion of the proximal primary edge, and wherein a plurality of remaining edges of the secondary film layer is offset inward from the first, second, and distal primary edges, respectively, wherein a latitudinal width of the secondary film layer is dimensioned to substantially wrap a girth of the handheld device, wherein the exterior primary surface has no adhesive for facilitating post-application use, wherein an interior surface of the secondary film layer has a secondary adhesive, wherein an exterior surface of the secondary film layer has no adhesive for facilitating post-application use, wherein an interior surface of each support layer has a support adhesive, wherein an exterior surface of each support layer has no adhesive for facilitating post-application use, wherein the primary and secondary film layers are transparent, and wherein the plurality of support layers is opaque; and further including a release layer coextensive with and engaged with the primary adhesive in such a way as to be aligned with the primary film layer.

In yet another aspect of the present invention, a method of simultaneously wrapping primary and secondary film layers to a handheld device, the method includes the following: providing the assembly disclosed above so that the exterior surface of the plurality of support layers is supported on a horizontal supporting surface; centering the handheld device within the opening, wherein a user interface of the handheld device is facing the opening; and successively folding the first, second, distal, and proximal edges over respective sides of the handheld device.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a disposable barrier applicator assembly that is used to form a barrier between a handheld device and the human hand. The barrier applicator assembly includes a thin primary film layer that is geometrically asymmetric and a thin secondary film layer that is removably adhered to an exterior surface of the primary film layer. The barrier applicator assembly also includes carrier structure having a plurality of film support layers wherein each support layer is independently adhered to the exterior surface of the primary film layer and/or the secondary film layer. Utilization of the barrier applicator assembly results in the exterior surface of the device wrapped in the primary film layer, wherein the exterior surface of primary film layer is substantially wrapped in the removable secondary film layer. Thereby providing an end user with a level of confidence that the primary film layer is contamination-free.

It should be understood that the directional term 'exterior' relates to the end product of the wrapped device/object, wherein the primary layer is wrapped around the exterior surface of the device/object, and wherein the exterior surface of the primary film layer is what is engaged by the end user. The directionally term 'interior' is opposite the 'exterior'. As a corollary, the term 'outer' (or outward) may be analogous with 'exterior'. Likewise, the term 'second major surface' is also analogous to 'exterior', while the term 'first major surface' is analogous with 'interior'.

Figure 1:
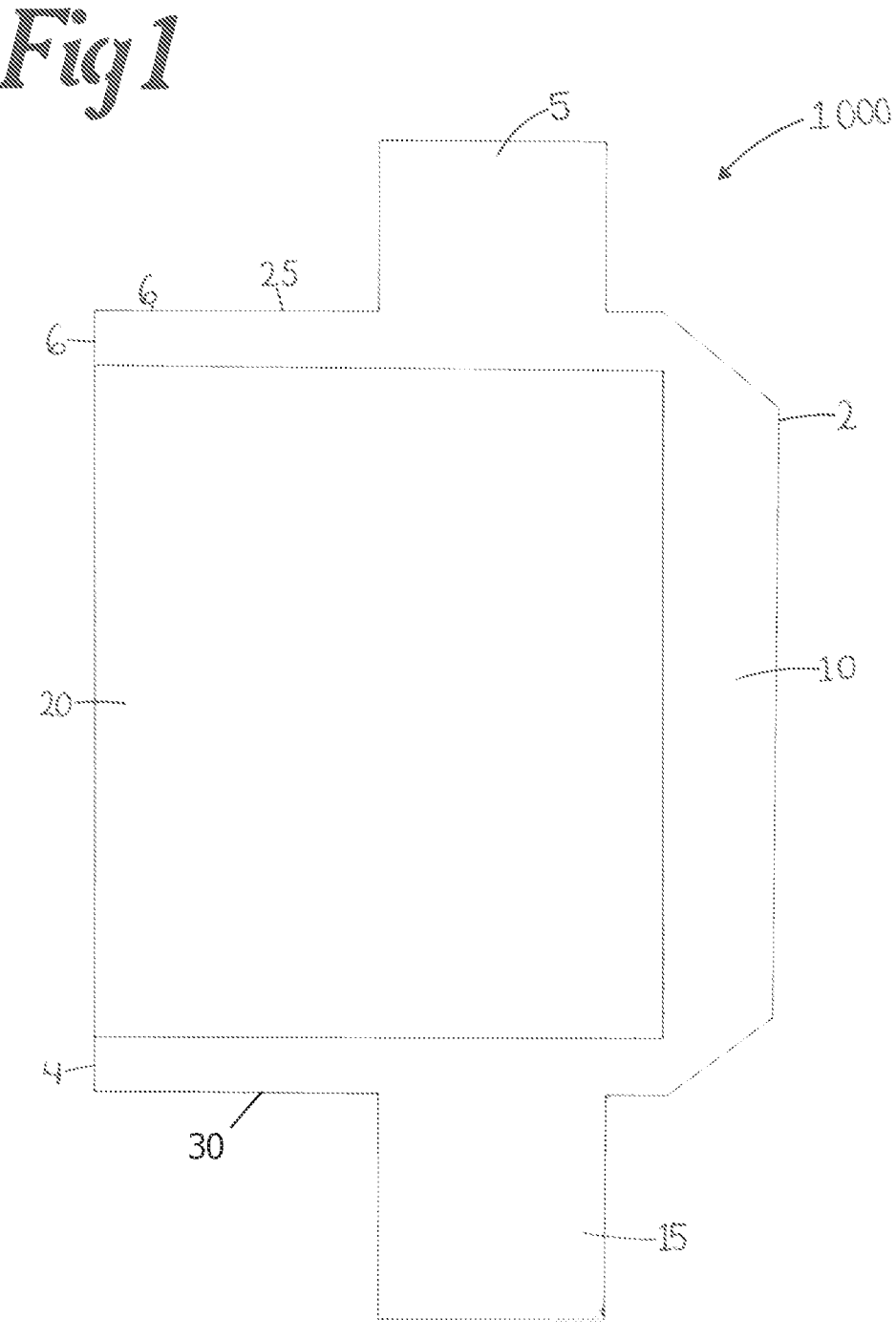
FIG. 1 is an exterior plan view of one embodiment of a film wrap system for handheld devices comprising a barrier applicator assembly. The barrier applicator assembly is shown with a primary film layer 10 and a detachable secondary film layer 20, though a plurality of supporting layers is excluded for clarity.

Referring now to FIG. 1, one embodiment of the present invention may include a cover film system or barrier application system for handheld devices designated in its entirety by reference numeral 1000. The system 1000 may be embodied in a barrier applicator assembly that includes a primary film layer 10. A secondary film layer 20 may be removably joined, by way of adhesive, to an exterior surface of the primary film layer 10.

The primary film layer 10 may have an asymmetrical shape that is defined by a first flap 5 extending from the first end 25 and a second flap 15 extending from the opposite second end 30. Perpendicular to the directional axis defined by the distance between the first end 25 and the second end 30 is a distal end 2 and an opposing proximal end 4 of the primary film layer 10. Primary film layer 10 represents the permanent film that covers a handheld device 55 and provides a barrier between the device 55 and contact with the hand of a user of the device 55. The detachable secondary film layer 20 protects the primary film layer 10 from contamination during the application process and prior to handling by the end user. The detachable secondary film layer 20 can, if desired, be removed by the end user to expose the non-contaminated primary film layer 10.

The secondary film layer 20 has a smaller footprint than the footprint of the primary film layer 10. The footprint/periphery of the secondary film layer 20 may be rectangular. The distal edge of the secondary film layer 20 may be aligned with a substantial portion of the distal edge/end 2 of the primary film layer, though all other edges of the periphery of the secondary film layer 20 may be inward of the other first, second, and distal edges/ends 25, 30 and 2 of the primary film layer 10.

Figure 2:
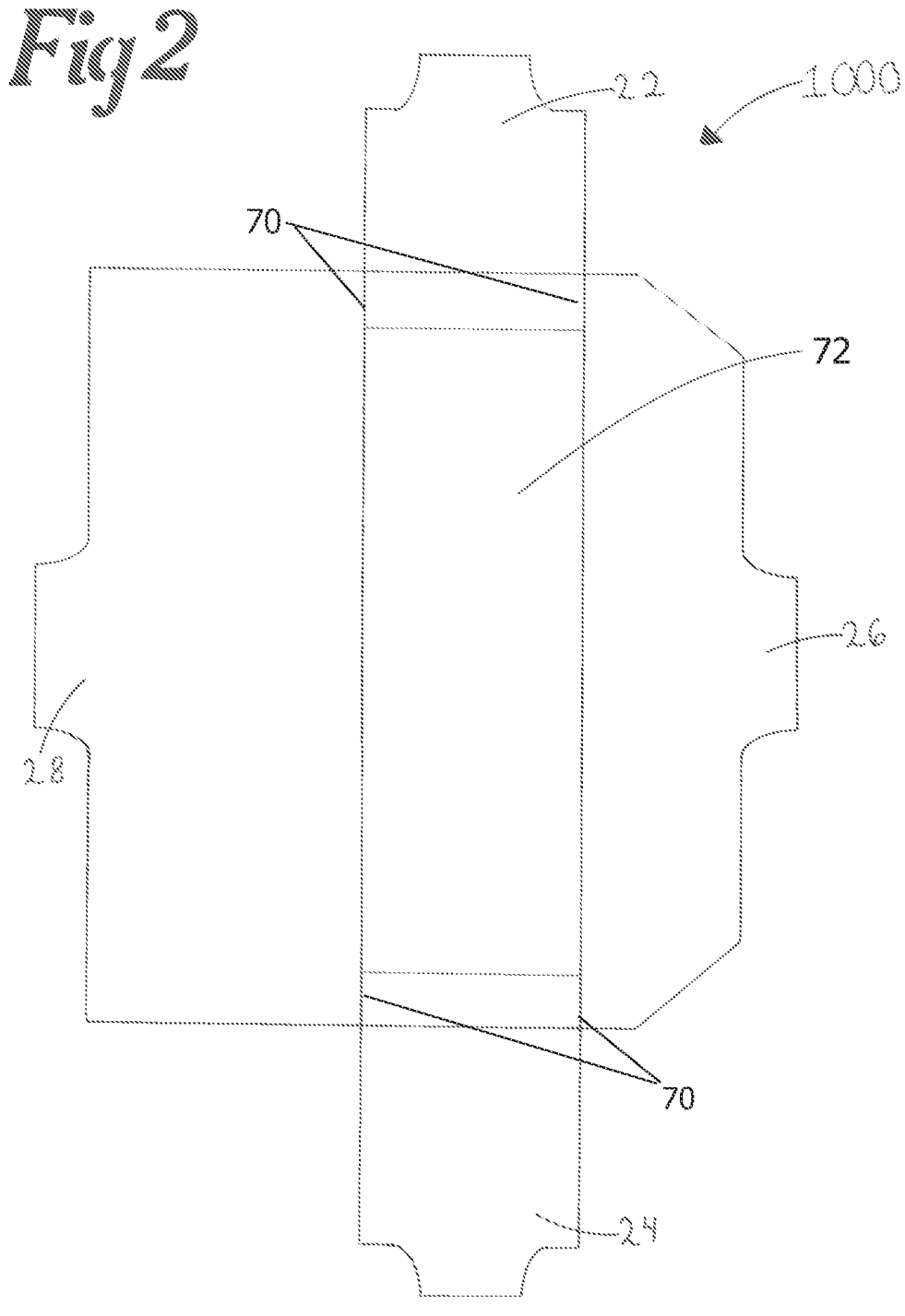
FIG. 2 is an exterior plan view of FIG. 1 showing the barrier applicator assembly with the plurality of support layers 22, 24, 26, and 28 (not shown in FIG. 1).

Referring to FIG. 2, the present invention may include a carrier layer of independent support layers that are removably attached to the primary film layer 10 and/or the detachable secondary film layer 20. The support layers 22, 24, 26 and 28 may be critical to add support to the thin film layers, preventing these adhesive-laden layers from folding over and adhering to themselves prior to removal of the release liner 60. The support layers are separated into four distinct articles by way demarcations 70, which may be cut lines, perforation, or the like. Each support layer may have an indicator or indicia (not shown) labeling each support layer to facilitate instructions of the step-by-step application process of applying the present invention.

The benefit of providing distinctly separate support layers is to assist in the application of the system 1000 to a handheld device 55 because wrapping a handheld device 55 with the primary film layer system is conducted in sequential steps. For example, the first flap 5 is folded over and adhered to the top portion of a handheld device 55 and then support layer 22 is removed. Next, the second flap 15 is folded over and adhered to the bottom portion of a handheld device 55 and then support layer 24 is removed. The handheld device 55 may then wrapped from one side by folding over the side represented by the distal end 2 followed by the removal of its support layer 26. The final step in the wrapping process is to fold over the film side represented by the proximal end 4 followed by the removal of its support layer 28.

Figure 5:
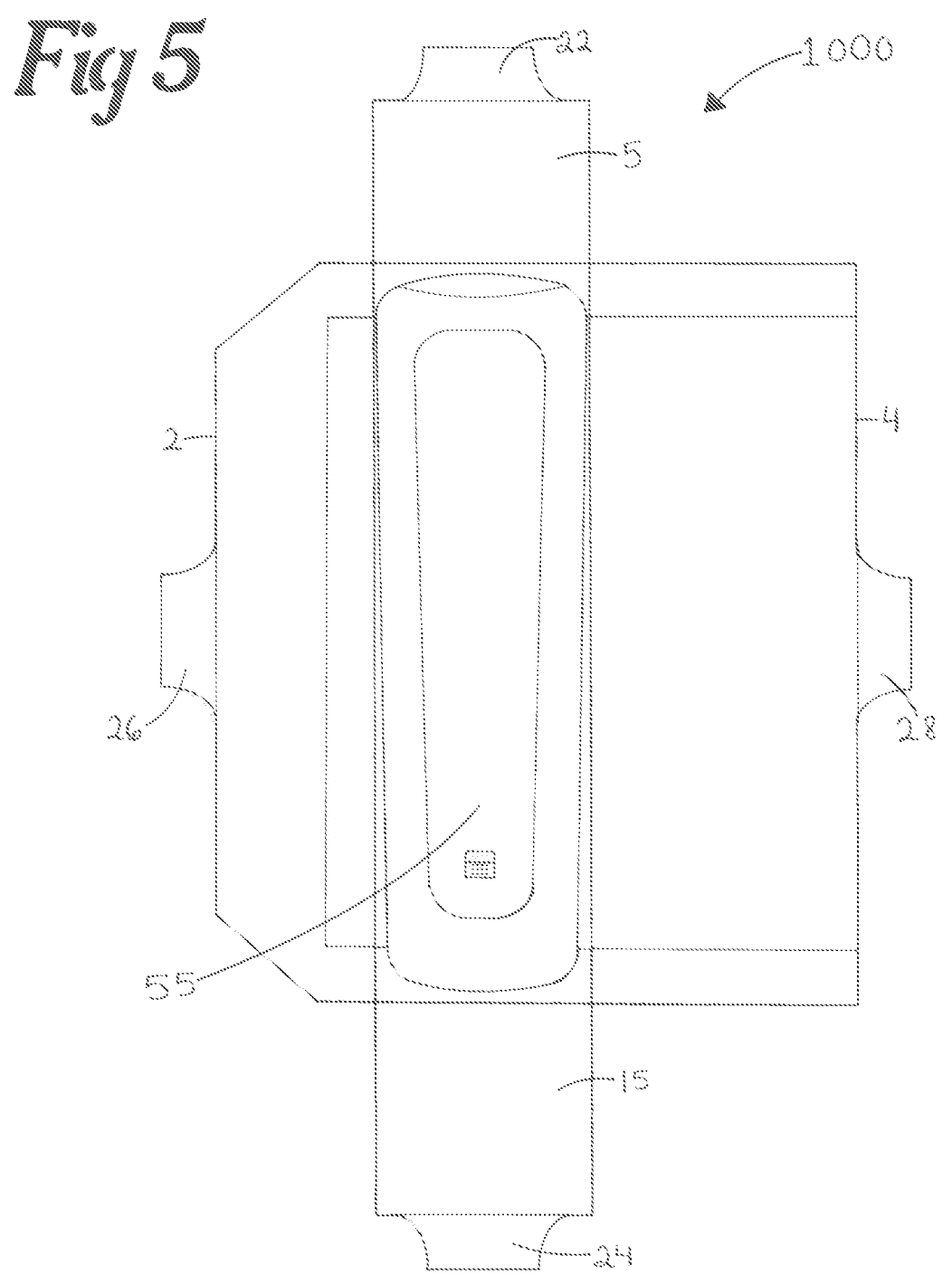
FIG. 5 is an interior plan view of an exemplary embodiment of the present invention, illustrating proper placement of a handheld device (e.g., a television remote control) prior to wrapping. Note, because of the transparency of the primary and secondary film layers 10 and 20, the peripheral edges of the plurality of support layers 22, 24, 26, and 28 are visible therethrough, as are the peripheral edges of the secondary film layer 20 visible through the primary film layer 10 here.

As illustrated in FIG. 2, prior to use, the four support layers 22, 24, 26 and 28 collectively define an opening or window 72, due to the transparency of the primary and second film layers 10 and 20. The primary and secondary film layers are visible through this opening. Furthermore, the location of the window 72 may identify where on barrier applicator assembly the to-be-wrapped device 55 is initially disposed, as illustrated in FIG. 5.

Figure 3:
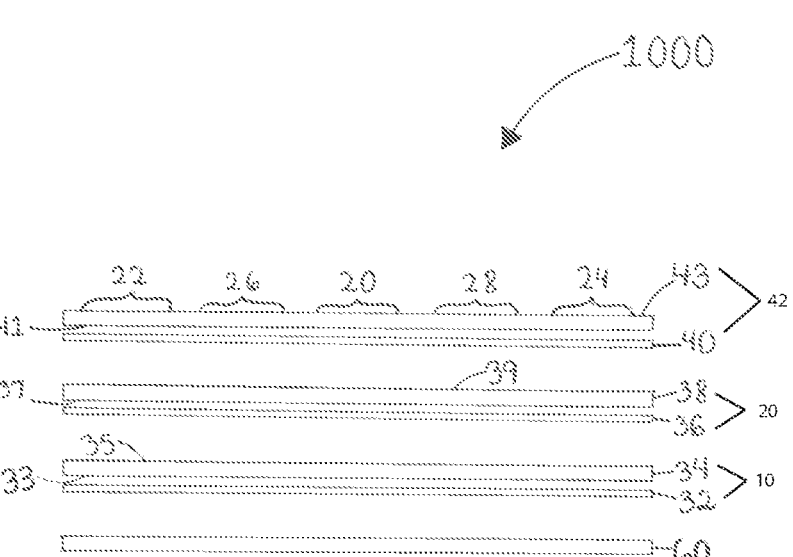
FIG. 3 is an exploded side elevation view of an exemplary embodiment of the present invention.

Referring to FIG. 3, which represents an exemplary side view of the present invention, the cover film system 1000 may include the primary film layer 10 having an elastic film backing 34. The elastic film backing 34 may include a first major surface 35 and a second major surface 33 opposite the first major surface 35. The first major surface 33 may be the "exterior surface" that faces away from the handheld device 55. The second major surface 33 may be the "interior surface" that faces the handheld device 55. A primary adhesive layer 32 may be disposed along the second major surface 33. The adhesive layer 32 may or may not be coextensive with the primary film layer 10 and its constituent parts 33, 34, and 35.

In any embodiment, preferably, the primary adhesive 32 is a pressure-sensitive adhesive (PSA). In any embodiment, the primary adhesive 32 may be applied as a continuous coating covering substantially the entire first major surface 33 of the backing 34. In any embodiment, a release liner 60 is attached to the exposed surface of the primary adhesive 32 on the first major surface 33 of the elastic film backing 34. FIG. 3 demonstrate one embodiment of the release liner 60 of the disclosure. The release liner 60 covers the primary adhesive 32 until the user is ready to wrap a handheld device using the system 1000. The release liner 60 may be a one piece or multiple piece liner. The release liner 60 may be generally coextensive with the primary film layer 10. The release liner 60 is peeled away as an initial step in the application process.

The secondary film layer 20 may have an elastic film backing 38 laminated to the primary film layer second major surface 35 by way of a secondary adhesive 36. The elastic film backing 38 may include a first major surface 39 and a second major surface 37 opposite the first major surface 39. The secondary adhesive 36 may be PSA or coated as a layer on the first major surface 37 of the elastic film backing 38, enabling lamination to second major surface 35.

Support layers can be incorporated to the barrier applicator assembly to prevent the adhesive film from folding over and adhering to itself after removal of the device release liner 60. The support layer 42 can be a continuous layer or a non-continuous layer in the form of tabs and/or the perimeter of the cover film system 100. A non-continuous support layer is represented in FIG. 3 by discrete support layers 42 that represents support layers 22, 24, 26 and 28. The support layers may be a film, substrate, or paper-like composition represented by 42. The support layers 42 may include a first major surface 43 and a second major surface 41 opposite the first major surface. An adhesive 40 may be PSA and/or coated as a layer on the first major surface 41 of the support layer 42 to be laminated to second major surface 39.

The cover film system 1000 can be formed in a variety of shapes including, for example, a trapezoid, a rectangle, a square. Each potential shape form could include either sharp corners or rounded corners.

Figure 4:
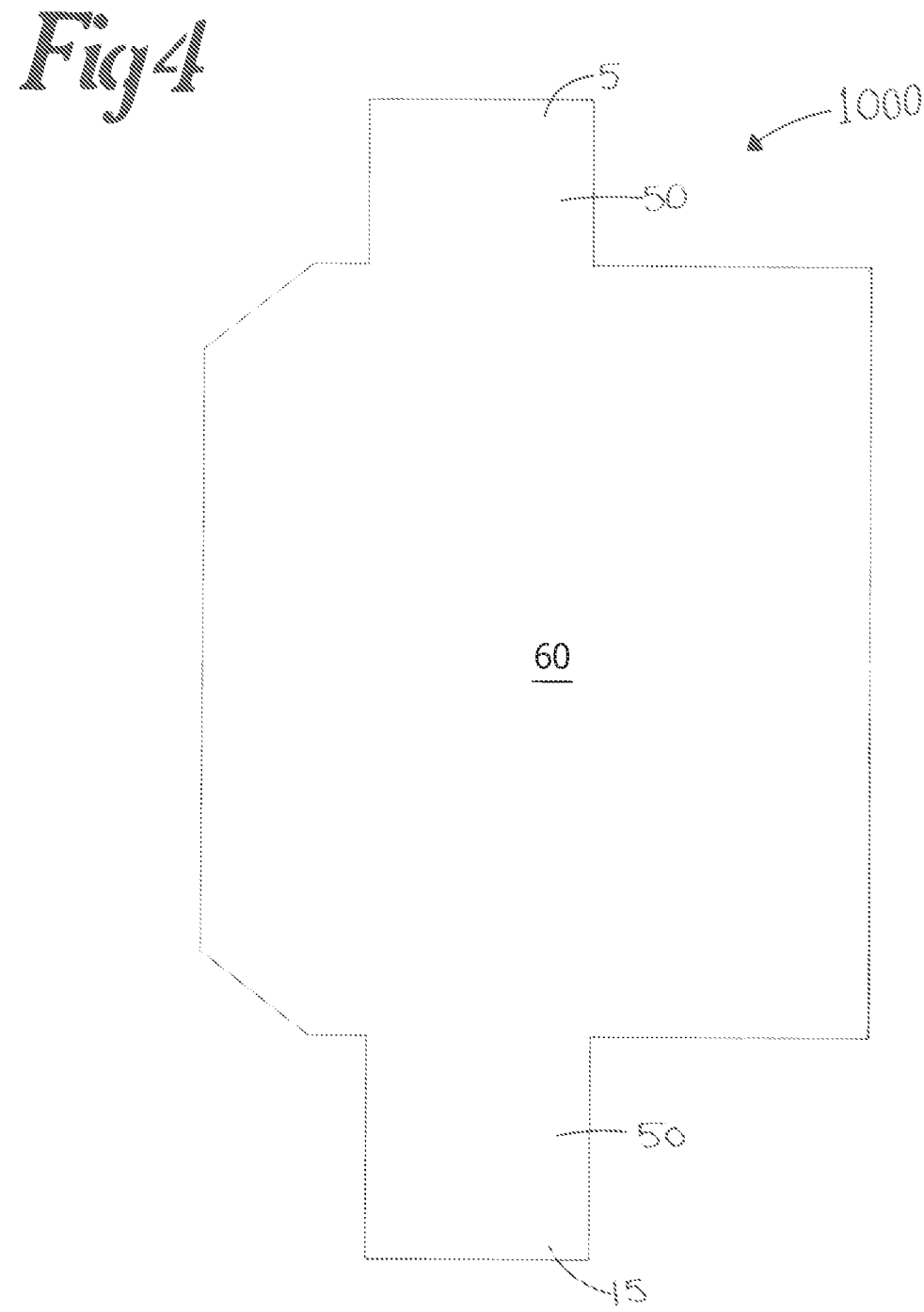
FIG. 4 is an interior plan view of a release liner of an exemplary embodiment of the present invention.

Referring to FIG. 4, representing a bottom/interior plan view of the barrier applicator assembly the present invention may include in another embodiment of this disclosure a release liner tab 60, wherein 50 is the interior or first major surface of the entire barrier applicator assembly that overlaps at least a portion of the first flap 5 and/or the second flap 15.

Referring to FIG. 5, a plan view of the "interior surface" of the cover film system 1000 with the handheld device 55 positioned for wrapping by way of the cover film system 1000. The handheld device 55 is oriented with the control button side of the device touching the secondary film layer 20 along the surface of the window 72 (defined by edges of the support layers 22, 24, 26, and 28).

Figure 6:
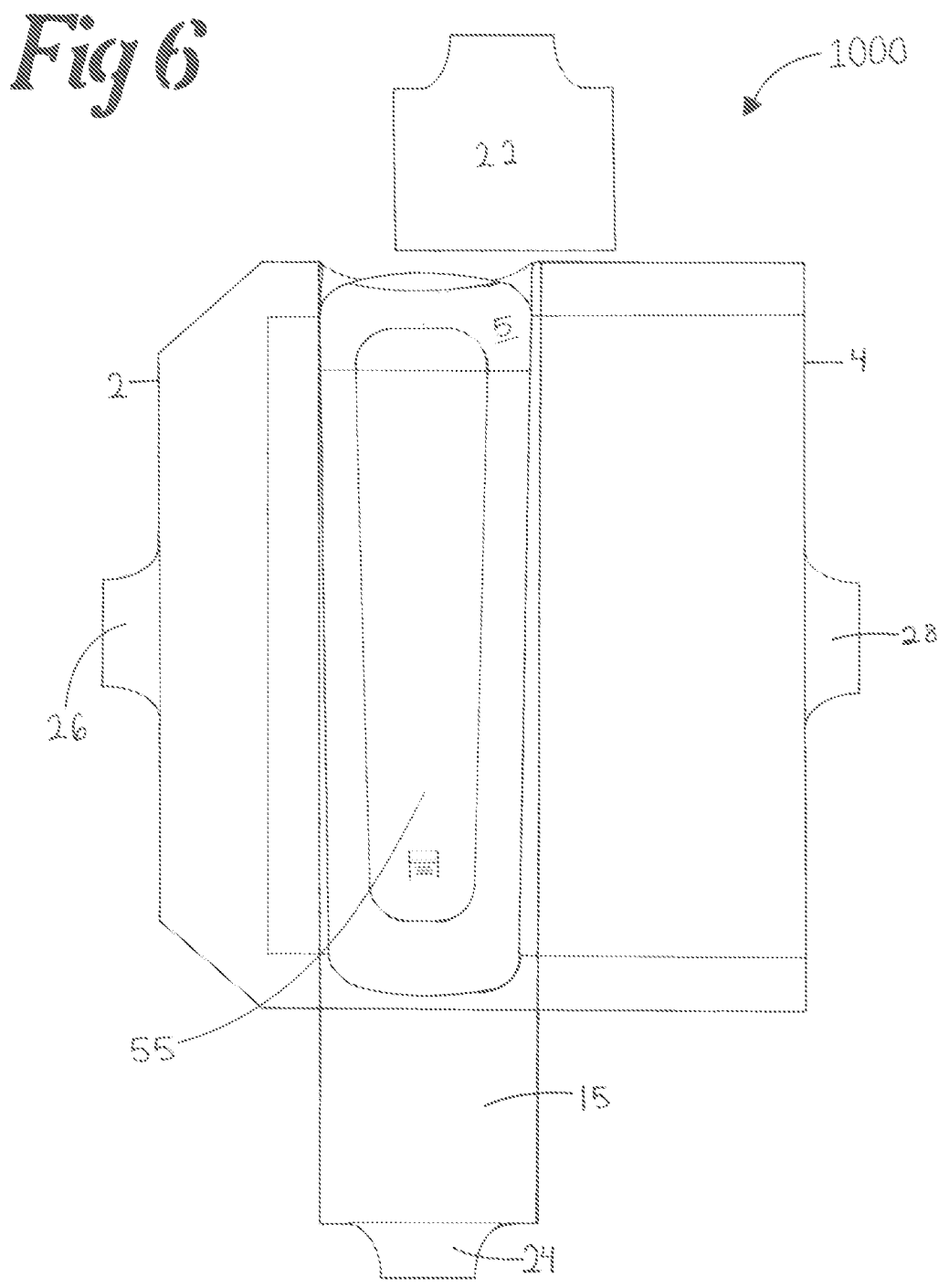
FIG. 6 is an interior plan view of FIG. 5 showing a first fold of the wrapping process, illustrating adhesion of the folded-over first flap 5 to the backside of the device and removal of a detachable first film support layer 22 from the first flap 5.

Referring to FIG. 6, a continuation of the diagram shown in FIG. 5, in which the first flap 5 has been folded over the backside of handheld device 55, thereby the first major surface 33 of cover film 10 is adhered to the backside surface of handheld device 55 via the primary adhesive layer 32. After this operation, support layer 22 is detached from the second major surface 35 of the cover film backing surface 34 associated with the first flap 5.

Figure 7:
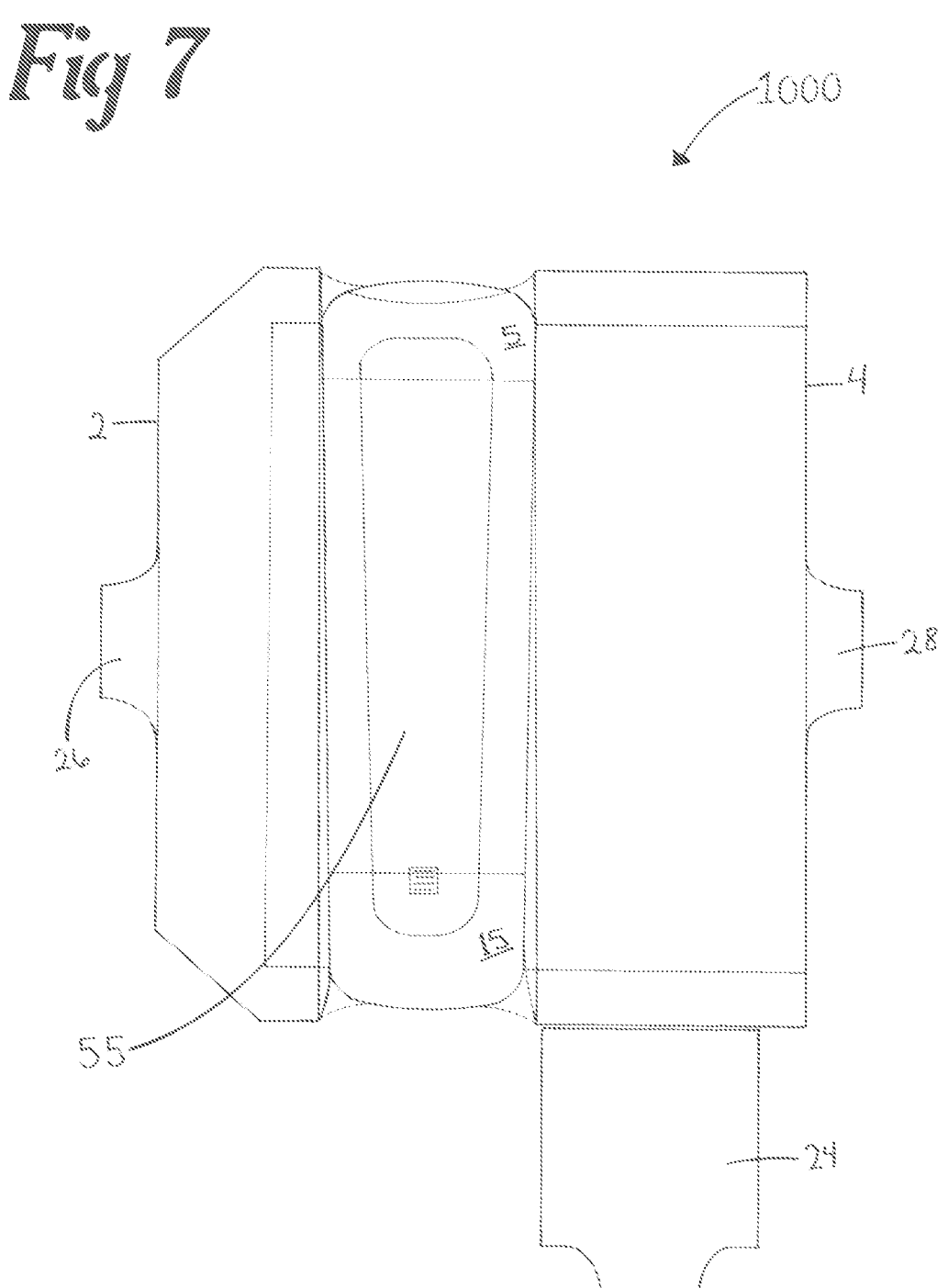
FIG. 7 is an interior plan view of the barrier applicator assembly of FIG. 6 showing a second fold of the second flap 15 during the wrapping process, illustrating adhesion of the extended-then-folded second flap 15 to the backside of the device and removal of the detachable second film support layer 24 from the second flap 15.

Referring to FIG. 7, a continuation of the diagram shown in FIG. 6, in which the second flap 15 has been folded over the backside of handheld device 55, thereby the first major surface 33 of cover film 10/second flap 15 is adhered to the backside surface of handheld device 55 with the adhesive layer 32. After this operation, support layer 24 is detached from the second major surface 35 of the cover film backing surface 34 associated with the second flap 15.

Figure 8:
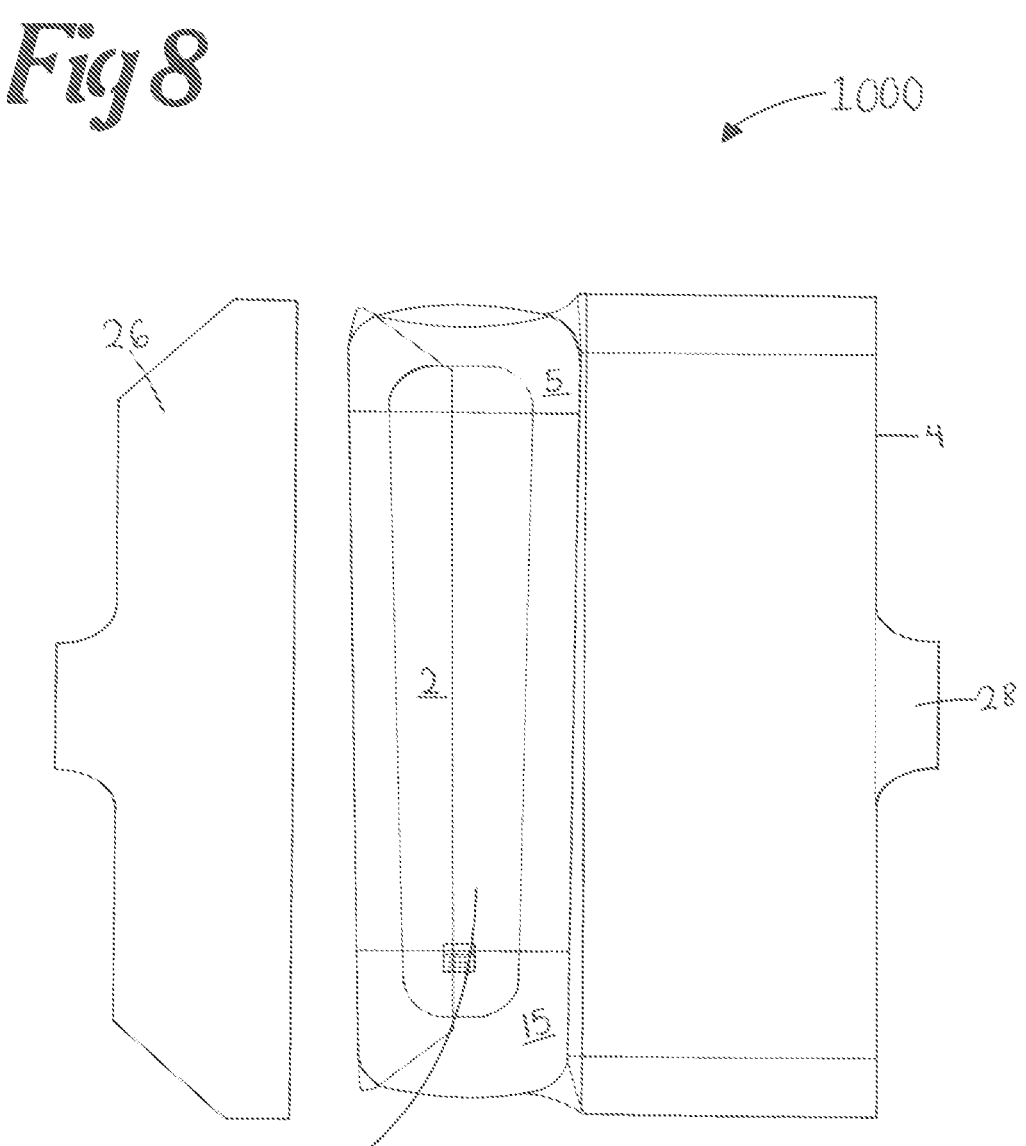
FIG. 8 is an interior plan view of the barrier applicator assembly of FIG. 7, showing a third fold of the wrapping process, illustrating adhesion of a distal portion 2 of the barrier applicator assembly to the backside of the device and removal of the detachable distal film support layer 26 from said distal portion.

Referring to FIG. 8, a continuation to the diagram shown in FIG. 7, in which the distal side 2 has been folded over the backside of handheld device 55, thereby the first major surface 33 of the primary film layer 10 is adhered to the backside surface of handheld device 55 via the associated portion of the adhesive layer 32. After this operation, support layer 26 is detached from second major surface 35 of the cover film backing surface 34.

Figure 9:
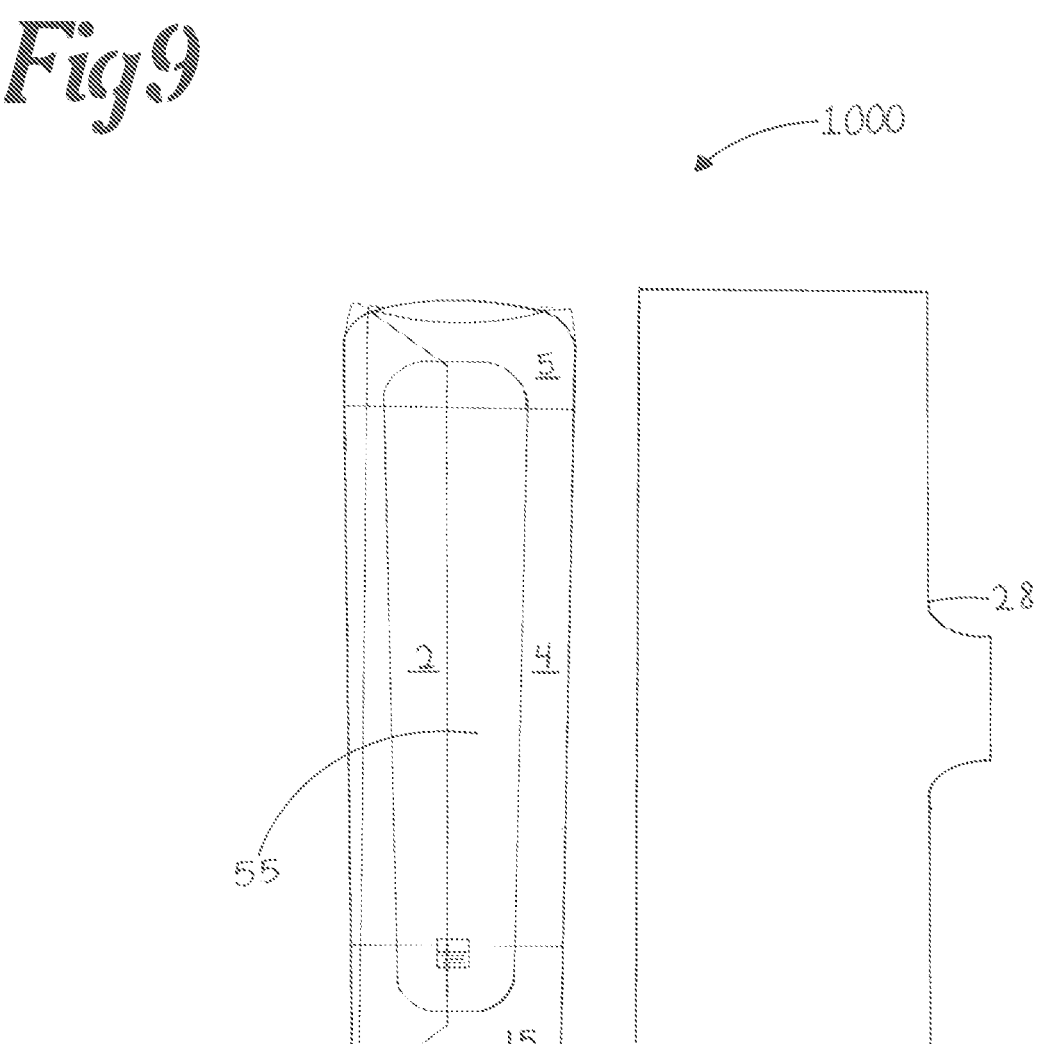
FIG. 9 is an interior plan view of the barrier applicator assembly of FIG. 8 showing a fourth fold of the wrapping process, illustrating adhesion of a proximal portion 4 of the barrier applicator assembly to the backside of the device and removal of the detachable proximal film support layer 28 from said proximal portion.

Referring to FIG. 9, a continuation to the diagram shown in FIG. 8, in which the proximal end 4 has been folded over the backside of handheld device 55, thereby the second major surface 33 of the proximal end 5 portion of the primary film layer 10 is adhered to the backside surface of handheld device 55 via the primary adhesive layer 32. After this operation, support layer 28 is detached from the relevant portion of the backing surface 35.

Figure 10:
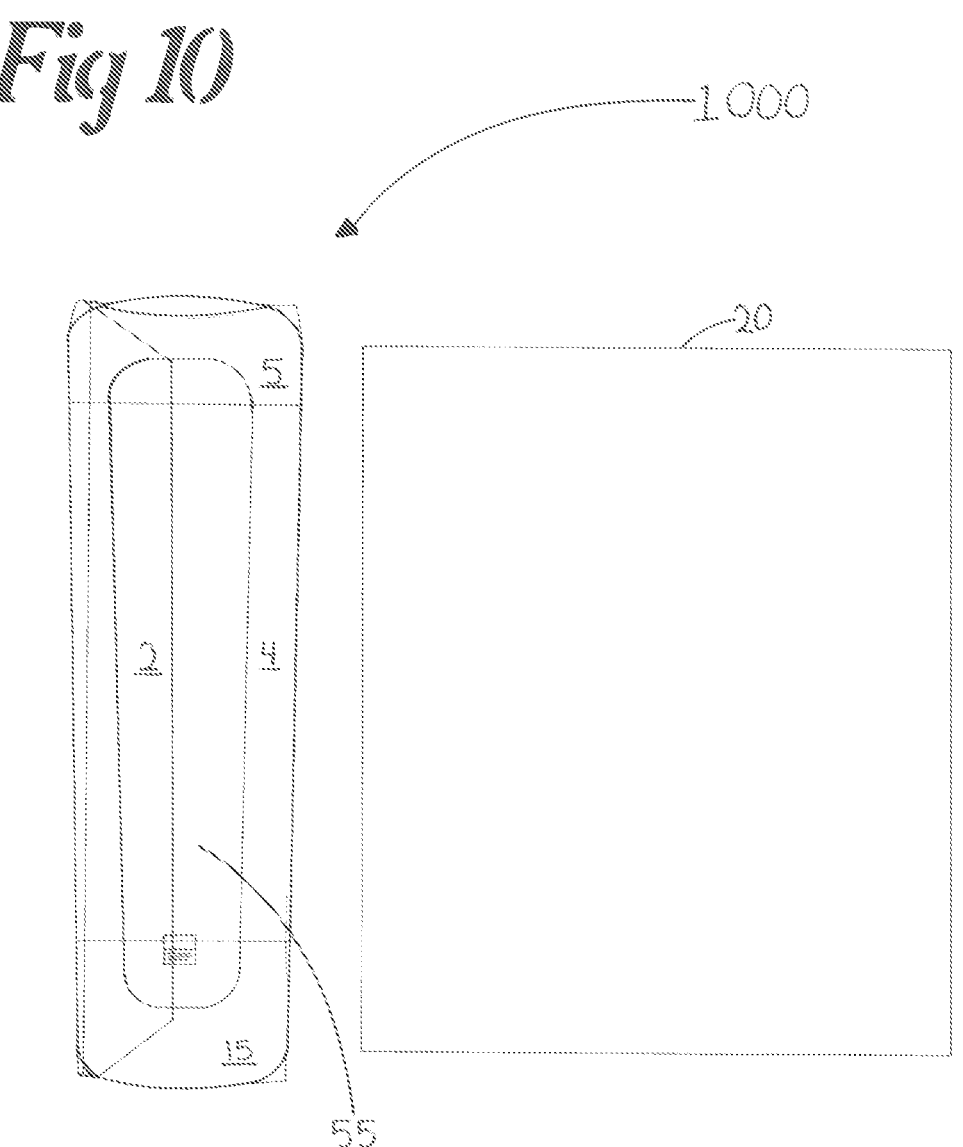
FIG. 10 is an interior plan view of the barrier applicator assembly of FIG. 9 showing the removal of the secondary film layer from the primary film layer, done by an end user to expose an exterior surface of the primary film layer.

Referring to FIG. 10, a continuation to the diagram shown in FIG. 9, in which the detachable film layer 20 is removed from the primary film layer 10, thereby exposing a previously uncontaminated first major surface 35 of the primary film layer 10 that completely envelops the handheld device 55.

The present disclosure generally relates to a conformable, disposable cover film that is used to form a barrier between a handheld device 55 and the human hand. In particular, the present disclosure relates to a thin primary film layer 10 that is geometrically asymmetric, a thin secondary film layer 20 that is removably adhered to the primary film layer 10 and a carrier structure (support layer) 22,24,26,28 that is removably adhered to one or both the primary 10 and secondary 20 film layers.

In one aspect, the primary film layer has a modified trapezoid shape with two extending flaps 5, 15 to assist in the application of the cover film system to a device. Specific sections of the film wrap system are sequentially folded over the top, bottom, left and right sides of a handheld device and provide a facile means to wrap and encase such device.

In another aspect, the support layers 22,24, 26, 28 is removably adhered to the primary film layer at four discrete support portions thereof. This design allows each discrete support section to be removed sequentially as the cover film system is sequentially folded over a handheld device, thereby, in effect, "unveiling" the entirety of the secondary film layer 20, which in turn is adhered to the primary film layer 10. Importantly, the secondary film layer 20 is offset from the center of the primary film layer 10 so that it entirely covers the encased handheld device after the wrapping process. This feature ensures that the primary film layer that will be exposed by the user upon removing the secondary layer film is protected from any contact that may have occurred during the wrapping process. The end-user can use a variety of methods to remove the secondary film layer 20 to minimize direct skin contact (e.g., sanitizing or wearing gloves). The secondary film layer 20 is preferably a colored or tinted film that is easily differentiated from the transparent primary film layer and is removed by the user to expose a previously untouched primary film layer 10 (i.e., first-time use).

The cover film system support layers that are attached to the primary film layer 10 and the detachable secondary film layer 20. The support layers 22, 24, 26 and 28 are present to add support to the thin film layers of the device and to prevent the adhesive film from folding over and adhering to itself after removal of the device release liner. The support layers are separated into four distinct articles either due to perforation 70 between the individual support layers and/or actual separate support layer sections that are adhered to the primary film layer and/or the detachable secondary film layer. The benefit of providing distinctly separate support layers is to assist in the application of the cover film system to a handheld device. Wrapping a handheld device with the primary film layer system is conducted in sequential steps. For example, the first flap 5 is folded over and adhered to the top portion of a handheld device and then support layer 22 is removed. Next, the second flap 15 is folded over and adhered to the bottom portion of a handheld device and then support layer 24 is removed. The handheld device is then wrapped from one side by folding over the side represented by distal end 2 followed by the removal of support layer 26. The final step in the wrapping process is to fold over the film side represented by the proximal end 4 followed by the removal of respective support layer 28. The end-user would then remove the detachable secondary film layer 20 to expose the contaminant-free primary film layer 10.

A method of manufacturing the present invention may include the following. A release liner (which could, for instance, be 3M Medical Release Liner 9955, Polypropylene, Fluoropolymer, 13"×8") may be laminated with a primary film layer (which could, for instance, be Clear 1.6 mil Glass Protection Tape, Uline). A film wraps system pattern, shown as 1000 in FIG. 1, may be secured to the release liner and primary film layer laminate. Using the pattern as a guide, the release liner and primary film layer laminate may be cut to the shape of the pattern. The detachable secondary film layer (which could, for instance, be Countertop Protection Tape, Uline, 12"×12") may be laminated to a temporary release liner (which could, for instance, be 3M Medical Release Liner 9955, Polypropylene, Fluoropolymer). The secondary film layer pattern 20, shown in FIG. 1, may be secured to the secondary film layer and temporary release liner. Using the pattern as a guide, the secondary film layer and temporary release liner laminate may be cut to the shape of the pattern. The secondary film layer pattern may then be removed from the temporary release liner and laminated onto the "top face" of the primary film layer in the location indicated as 20 in FIG. 1. Support layers may then laminated to the top side of the film wrap system using five individual pieces cut from a paper release liner (which could, for instance, be Fox River Associates, S1S). The individual pieces were placed in locations 2, 4, 20, 26 and 28 as indicated in FIG. 2.

As used in this application, the term "about" or "approximately" refers to a range of values within plus or minus 10% of the specified number. And the term "substantially" refers to up to 80% or more of an entirety. The words "about," "approximately," or the like, when accompanying a numerical value, are to be construed as indicating a deviation as would be appreciated by one of ordinary skill in the art to operate satisfactorily for an intended purpose.

Recitation of ranges of values herein are not intended to be limiting, referring instead individually to any and all values falling within the range, unless otherwise indicated, and each separate value within such a range is incorporated into the specification as if it were individually recited herein. Ranges of values and/or numeric values are provided herein as examples only, and do not constitute a limitation on the scope of the described embodiments.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down,"

and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A barrier applicator assembly for a handheld object, the assembly comprising:
a primary film layer having opposing exterior and interior primary surfaces;
a primary adhesive along a substantial portion of the interior primary surface;
a secondary film layer adhered along the exterior primary surface; and
a plurality of support layers adhered to portions of the exterior primary surface, wherein the plurality of support layers defines an opening through which the primary adhesive is exposed, wherein a boundary of the opening is dimensioned and shaped so that a periphery of the handheld object is circumscribed by the boundary of the opening when the handheld object is placed within the opening, whereby the primary film conforms to a substantial portion of a surface of the handheld object placed within the opening by way of adhesion between the primary adhesive and the placed surface, wherein the secondary film layer is dimensioned to wrap an entirety of a girth of the handheld object so that opposing edges of the secondary film layer overlap.

2. The assembly of claim 1, wherein the primary film layer comprises longitudinally opposing first and second primary edges, and further comprising a first flap and a second flap extending from the first and second primary edges, respectively, away from the opening.

3. The assembly of claim 2, wherein the primary film layer comprises latitudinal opposing distal and proximal primary edges.

4. The assembly of claim 3, wherein each support layer has a tab, wherein each tab protrudes beyond at least one of the first, second, distal, or proximal primary edges.

5. The assembly of claim 3, wherein the distal primary edge has cut corners.

6. The assembly of claim 4, wherein a proximal edge of the secondary film layer aligns with a substantial portion of the proximal primary edge, and wherein a plurality of remaining edges of the secondary film layer is offset inward from the first, second, and distal primary edges, respectively.

7. The assembly of claim 2, wherein the secondary film layer has no holes.

8. The assembly of claim 7, wherein the exterior primary surface has no adhesive for facilitating post-application use.

9. The assembly of claim 7, wherein the secondary film layer extends longitudinally along a substantial portion of an exterior surface of the placed handheld object.

10. The assembly of claim 1, wherein an interior surface of the secondary film layer has a secondary adhesive that covers a substantial portion of the interior surface, wherein an exterior surface of the secondary film layer has no adhesive for facilitating post-application use, and wherein the barrier applicator assembly is frameless.

11. The assembly of claim 10, wherein an interior surface of each support layer has a support adhesive.

12. The assembly of claim 11, wherein an exterior surface of each support layer has no adhesive for facilitating post-application use.

13. The assembly of claim 12, wherein the primary and secondary film layers are transparent, and wherein the plurality of support layers is opaque.

14. The assembly of claim 13, further comprising a release layer coextensive with and engaged with the primary adhesive in such a way as to be aligned with the primary film layer.

15. The assembly of claim 14, wherein the opening is defined by a contiguous demarcation of the plurality of support layers.

16. The assembly of claim 15, wherein the handheld object is a remote control for an electronic device.

17. A method of simultaneously wrapping primary and secondary film layers to a handheld device the method comprising:
providing the assembly of claim 6 so that the exterior surface of the plurality of support layers is supported on a horizontal supporting surface;
centering the handheld device within the opening, wherein a user interface of the handheld device is facing the opening; and
successively folding the first, second, distal, and proximal edges over respective sides of the handheld device.

18. A frameless barrier applicator assembly for a handheld device having input elements, the assembly comprising:
a primary film layer having opposing exterior and interior primary surfaces;
a primary adhesive along a substantial portion of the interior primary surface so that when the primary film layer is wrapped around the handheld object the primary adhesive enables haptic operability of the input elements through the primary film; and
a secondary film layer adhered along the exterior primary surface, wherein a latitudinal secondary width of the secondary film layer is dimensioned to wrap an entirety of a girth of the handheld object, and wherein a latitudinal primary width of the primary film layer is greater than the latitudinal secondary width.

19. The assembly of claim 18, wherein the handheld object is a remote control, and the input elements are input buttons, and wherein the secondary layer has no holes.

20. The assembly of claim 18, further comprising:
wherein the primary film layer comprises a modified trapezoid shape;
a flap extending from each longitudinal edge of the modified trapezoid shape; and
wherein a footprint of the secondary film layer is mutually inclusive of a footprint of the primary film layer.

* * * * *